June 1, 1926.
T. MORTON
1,586,572
SPRING FASTENING OF THE BUTTON TYPE
Filed Nov. 3, 1925     2 Sheets-Sheet 1
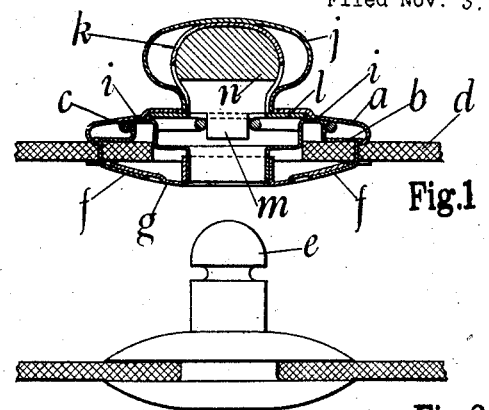
Fig.1
Fig.2
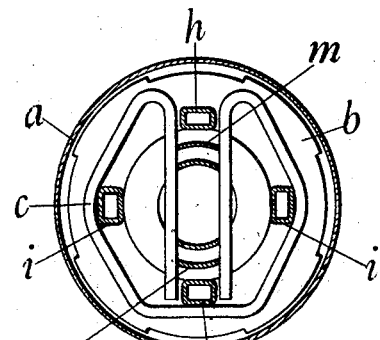
Fig.3
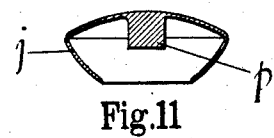
Fig.11
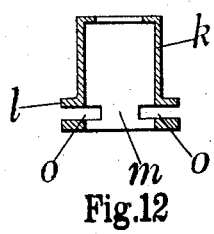
Fig.12
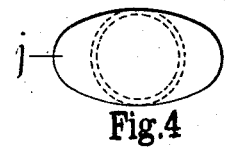
Fig.4
Fig.5
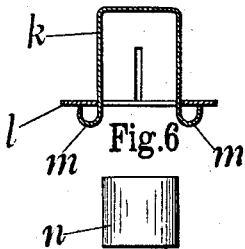
Fig.6
Fig.7
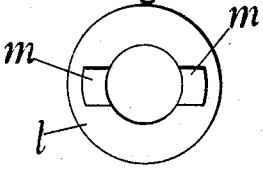
Fig.8
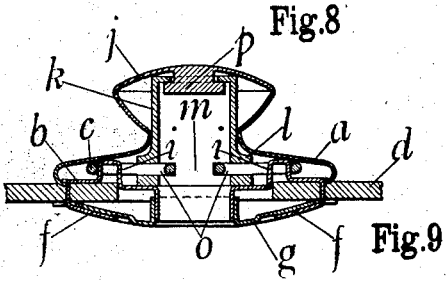
Fig.9
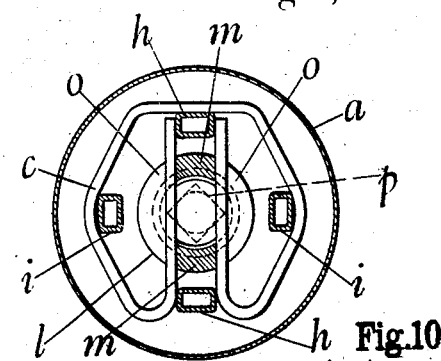
Fig.10
T. Morton
INVENTOR
By: *Marks & Clerk*

June 1, 1926.

T. MORTON 1,586,572

SPRING FASTENING OF THE BUTTON TYPE

Filed Nov. 3, 1925    2 Sheets-Sheet 2

T. Morton

INVENTOR

By: Marks & Clerk
Att'ys

Patented June 1, 1926.

1,586,572

UNITED STATES PATENT OFFICE.

THOMAS MORTON, OF BIRMINGHAM, ENGLAND.

SPRING FASTENING OF THE BUTTON TYPE.

Application filed November 3, 1925, Serial No. 66,610, and in Great Britain November 4, 1924.

This invention has for its object to provide an improved fastening of the button type suited for a variety of purposes and intended primarily for use in conjunction with the flexible weather screens of motor vehicles.

The invention comprises the combination within a body part, of a spring catch member having a pair of parallel portions formed integrally with a peripheral portion, a rotatable finger piece provided at its inner end or side with a pair of abutments arranged to lie between the parallel members of the spring catch by which the body part is detachably secured to a grooved or shouldered element forming the complementary part of the fastening, and a system of four stops, two of which lie between the parallel members of the catch whilst the other two lie in contact with opposite internal peripheral portions of the catch.

The invention also comprises the formation of the finger piece and actuating abutments on a pair of separate telescopic or like parts which are united by expanding or riveting one part within the other. The expanding of one part into the other may be effected by a metal plug which by compression is caused to dilate one end of the inner part into engagement with the outer part.

Also the invention comprises the use of a catch member having a polygonally shaped periphery and a pair of parallel transverse portions formed integrally with the periphery.

In the two accompanying sheets of explanatory drawings:—

Figure 1 is a sectional side elevation of one form of fastening constructed in accordance with this invention.

Figure 2 is an elevation of the complementary part of the fastening adapted to be detachably engaged by the spring members in the device shown in Figure 1.

Figure 3 is a sectional plan of the fastening shown in Figure 1.

Figures 4 and 5 are plan and sectional views of the outer portion of the knob or finger piece.

Figure 6 is a sectional view of the inner or operative portion of the finger piece which actuates the spring member on the fastening.

Figure 7 is an elevation of a cylindrical soft metal plug by which the parts shown in Figures 5 and 6 are secured together.

Figure 8 is an inverted plan of the part shown in Figure 6.

Figures 9 and 10 are sectional side elevation and sectional inverted plan showing a modified construction of the fastening, and Figures 11 and 12 are sectional views of the pieces from which the knob or actuating element of this modified construction is made.

Figure 13:
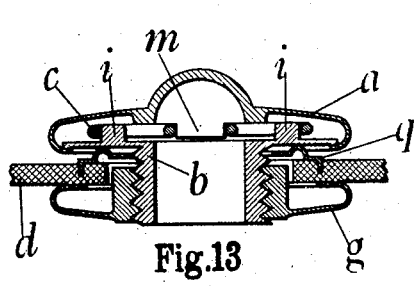
Figure 13 is a sectional elevation of a further construction of fastening.

In carrying the invention into effect as shown in Figures 1–8, the body part of the fastening is made from a pair of sheet metal elements $a$, $b$, of circular form adapted when placed together to form a shallow internal cavity in which is located the catch spring $c$. One of the parts ($b$) is adapted in any convenient manner for effecting attachment to the material as $d$ on to which the fastening is to be secured, and in the same part is formed a central aperture to accommodate the grooved or shouldered portion $e$ of the complementary part of the fastening. The part $b$ in the form shown in Figure 1 is attached to the material $d$ by the provision on the underside of the same of tongue pieces $f$ adapted to be inserted through slots in a washer $g$ and bent over the same as illustrated. On the inner face of the part $b$ four equidistant stop pieces $h$, $i$ are formed. One pair $h$ lie between the two transverse parallel portions of the wire catch spring $c$ which detachably engage the groove or shoulder of the other part of the fastening. The other pair of stop pieces $i$ lie between opposite internal peripheral portions of the spring as shown. As hitherto, the spring is made by bending a length of wire to the required form so that the parallel portions are integral with the peripheral portion. In my fastenings the peripheral portion is made of polygonal form. The said stop pieces serve also as distance pieces which determine the depth of the space or chamber containing the spring.

Preferably the two portions of the body part are united by bending a flanged edge of the part $a$ over the periphery of the other part $b$. The said edge may advantageously be serrated to augment the grip of the article on the material to which it is secured.

The outer element of the body part is also formed with a central aperture through which passes the inner portion of a turn button or finger piece situated on the outer side of the fastening. The finger piece is preferably made from the several parts shown in Figures 4-7. The outer one $j$ is hollow and is pressed to an elliptical form. Another $k$ is of tubular and cylindrical form, and at one end is provided with a flange $l$. The parts $k$, $l$, are held together by tongue pieces $m$ on the part $k$ which are bent over the underside of the same and are also adapted to serve as projecting abutment pieces which lie between the transverse members of the spring $c$. The part $k$ is inserted in the other part $j$ at opposite sides of the outer portion $a$ of the body and are secured together by forcing into the inner part a soft metal plug $n$ which is expanded under pressure, and the expansion causes the upper portion of the inner part $k$ to dilate into engagement with the elliptical finger piece $j$ as shown in Figure 1. When so secured the parts cannot be separated, but they are freely rotatable as one piece relatively to the body part $a$. When rotated the abutment pieces $m$ press apart the spring members and release them from the complementary portion $e$ of the fastening. Excessive rotation of the finger piece such as might cause permanent distortion of the spring is prevented by the pair of stop pieces $i$ which engage the peripheral portions of the spring.

Engagement of the two parts of the fastening is effected by pressing one part over the other so that the spring members engage the groove or head in the usual manner.

The device shown in Figures 9-12 differs from that of Figure 1 only in the construction of the finger piece. In the modification the finger piece consists of an inner tubular part $k$ which is formed integrally with a flange $l$, the latter being cut transversely to form a pair of slots $o$ in which the transverse parts of the spring $c$ can lie. The portions $m$ intermediate to the slots serve as abutments for expanding the said portions of the spring out of engagement with the complementary portion of the fastening. The inner part $k$ is formed with an internal shoulder at its upper end and in this shoulder is formed a square hole through which can pass a projection $p$ from the inner side of the outer portion $j$ of the finger piece. After the parts $j$ and $k$ have been placed in position over the part $a$, they are united by squeezing or riveting the projection $p$ over the internal shoulder of $k$ as shown in Figure 9.

Figure 14:
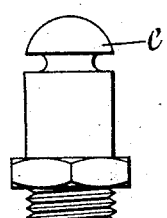
Figure 14 shows an alternative element with which the fastening can engage.

For some purposes, I prefer to actuate the catch or spring members by one of the elements of the body part, instead of by a separate finger piece. I then employ the construction shown in Figures 13-15. The body part is made as before from two principal elements $a$, $b$ adapted to contain the catch or spring members between them. But instead of securing the body elements together rigidly as formerly, I make the outer one $a$ rotatable relatively to the other, the two parts being prevented from separation preferably by bending the periphery of the outer element over the periphery of the inner element. The outer element is adapted to serve as a finger piece. This may be effected by making the part $a$ as shown in Figure 13 and knurling the periphery of the said part. Or the part $a$ may be provided with a projecting knob $a'$ as shown in Figure 16. The knob may be made integrally with the outer element of the body part, or it may be made separately in a substantially similar manner to the knob shown in Figure 1, an outer part being slipped over an inner part, and the two secured by expanding the inner part under the action of an expansible metal plug $n$, as in Figure 16. Internally the part $a$ is provided with projections or abutments $m$ for engaging and actuating the catch or spring members.

Figure 15:
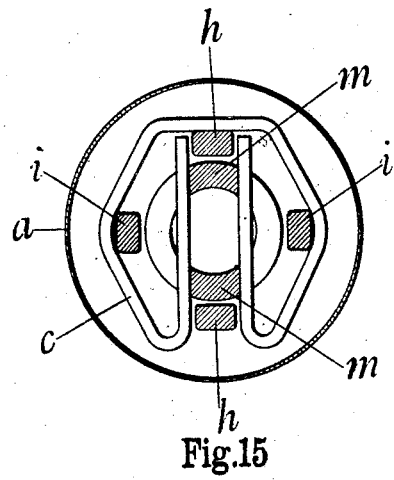
Figure 15 is a sectional plan of the fastening shown in Figure 13.
Figure 16:
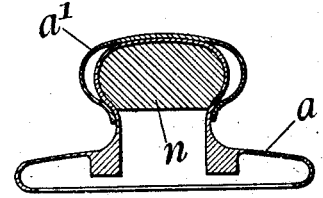
Figure 16 is a sectional view of a modified form of a finger piece for use with the fastening shown in Figure 13.

The principal difference between the construction shown in Figures 13 and 15 and that shown in Figure 1 is that the independently rotatable finger piece is dispensed with and the outer element of the body part is adapted to serve the same function. Thereby I am enabled to produce a flatter or more compact fastening when required. In other particulars the fastening is essentially the same as that first described.

In the construction shown in Figure 13, it is necessary in some cases to make special provision for preventing the under edge of the element $a$ from embedding itself in the flexible material to which the fastening is attached. For this purpose a washer $q$ is placed beneath the body part. Preferably the washer is provided around its periphery with tooth like projections which can engage the flexible material. Also the washer is adapted to engage the underside of the body part or is otherwise attached thereto, to prevent relative rotation.

In Figure 13 an alternative device is shown for securing the fastening to the fabric. Instead of using tongue pieces as already described, the boss of the part $b$ is externally screw threaded for engagement by an internally screw threaded washer $g$.

Figure 17:
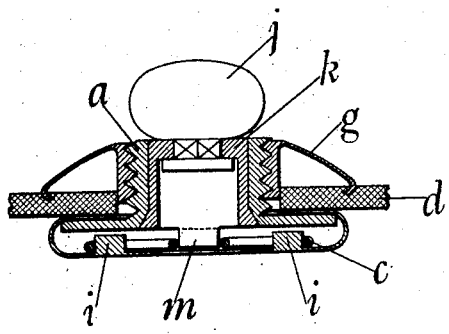
Figure 17 is a sectional elevation of a still further construction of fastening.
Figure 18:
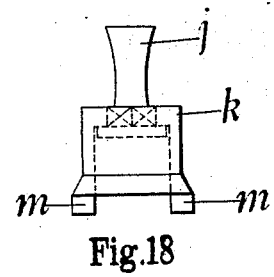
Figure 18 is an elevation of the finger piece used in the fastening shown in Figure 17.

For some purposes it is advantageous to provide the attaching means at the upper or outer side of the body part. This may be effected as shown in Figure 17. The element $a$ of the body part through which the rotatable finger piece passes is adapted to form part of the attaching device. Thus, the boss on the outer element of the body part may be screwed externally, for co-operation with a screwed washer $g$ which screws on to the boss. Or the attachment device shown in Figure 1 may be used. The finger piece is made in two parts, $j$, $k$, which are secured together in a manner similar to that already described in connection with Figures 11 and 12. The inner part $j$ is formed with projections or abutments $m$ for actuating the spring member.

Having thus described my invention what I claim as new and desire to secure by Letters Patent is:—

1. In spring fastenings of the button type, the combination of a body part, a spring catch member having a pair of parallel portions formed integrally with a peripheral portion, a rotatable finger piece provided at its inner end or side with a pair of abutments arranged to lie between the parallel members of said catch member, by which the body part is detachably secured to a grooved or shouldered element forming the complementary part of the fastening, and a system of four stops, two of which lie between the parallel members of the catch, whilst the other two lie in contact with opposite internal peripheral portions of the catch, substantially as described.

2. In spring fastenings of the button type, the combination of a pair of members forming the body part, a spring catch member located within the body part, said catch member having a polygonally shaped peripheral portion and a pair of transverse parallel parts formed integrally with the periphery, a system of four stops on one of the body members, two of the stops engaging the inner periphery of the catch member and the other two located between the transverse portions of the said member, a finger piece rotatably carried on the other body member, and a pair of abutments in conjunction with the finger piece and adapted to act on the transverse portions of the catch member, substantially as described.

In testimony whereof I have signed my name to this specification.

THOMAS MORTON.